United States Patent [19]

Shibaguchi et al.

[11] Patent Number: 5,124,835
[45] Date of Patent: Jun. 23, 1992

[54] OPTICAL SCANNING APPARATUS

[75] Inventors: Takashi Shibaguchi, Yokohama; Hiroyoshi Funato, Chigasaki, both of Japan

[73] Assignee: Ricoh Company, Ltd., Tokyo, Japan

[21] Appl. No.: 540,933

[22] Filed: Jun. 20, 1990

[30] Foreign Application Priority Data

Jun. 21, 1989 [JP] Japan .................. 1-158807
Feb. 6, 1990 [JP] Japan .................. 2-26865

[51] Int. Cl.⁵ .......................... G02B 5/30; G02F 1/00
[52] U.S. Cl. ............................................. 359/319
[58] Field of Search .............. 350/379, 380, 384, 409, 350/371; 359/315–319

[56] References Cited

U.S. PATENT DOCUMENTS

| | | | |
|---|---|---|---|
| 3,424,513 | 1/1969 | Lotspeich | 350/379 |
| 3,736,046 | 5/1973 | Zook | 350/379 |
| 3,892,469 | 7/1975 | Lotspeich | 350/379 |
| 4,124,273 | 11/1978 | Huignard et al. | 350/379 |
| 4,466,703 | 8/1984 | Nishimoto | 350/379 |
| 4,614,408 | 9/1986 | Mir et al. | 350/379 |

FOREIGN PATENT DOCUMENTS

| | | |
|---|---|---|
| 56-71374 | 6/1981 | Japan . |
| 61-33073 | 2/1986 | Japan . |
| 61-66467 | 4/1986 | Japan . |
| 61-113018 | 5/1986 | Japan . |

Primary Examiner—Ian J. Lobo
Attorney, Agent, or Firm—Oblon, Spivak, McClelland, Maier & Neustadt

[57] ABSTRACT

An optical scanning apparatus for scanning a beam of light from a light source over a target surface by a scanning mechanism to form an image on the target surface. The optical scanning apparatus includes an electro-optic lens provided in an optical path between the light source and the scanning mechanism, a plurality of electrodes being provided on top and bottom surfaces of the electro-optic lens for producing an electric field in a direction perpendicular to the direction of the optical path, and a voltage applying unit being connected to the electrodes. The electro-optic lens is made from an electro-optic medium, and has an ingress surface and and egress surface which are ground to exhibit an adequate electro-optic effect. The beam is cast on the target surface to produce a dot having an enlarged diameter in the vertical scanning direction and in the horizontal scanning direction due to the electro-optic effect of the electro-optic medium when the electric field is produced within the electro-optic lens.

9 Claims, 13 Drawing Sheets

OPTICAL SCANNING APPARATUS

BACKGROUND OF THE INVENTION

The present invention generally relates to optical scanning apparatus, and more particularly to an optical scanning apparatus which is used in an image forming system such as a laser printer, a facsimile machine, a copying machine or the like for forming or reproducing an image through an electrophotographic technique.

There are several prior art image forming techniques which have been developed to achieve an image density modification. A conventional apparatus as disclosed in Japanese Published Patent Application No. 61-66467 is directed to changing a diameter of a laser beam by controlling a power to drive a semiconductor laser. However, the change in the beam spot diameter obtained from an ordinary laser beam power is very limited, and usually it is difficult to make a beam diameter twice as large as the original diameter without causing a problem about image quality. Also, for example, it is difficult to modify the density of the image to be formed from 600 dpi (dots per inch) to 300 dpi while keeping a clear image with this prior art apparatus. And an extremely large change in the drive current of the semiconductor laser device is required for increasing and decreasing the laser beam power, which may result in the deterioration of the semiconductor laser device due to a great amount of electric current being consumed.

Another conventional apparatus as disclosed in Japanese Published Patent Application No. 61-113018 is directed to the provision of a variable aperture or beam limiting device in an optical path and the provision of a control device for controlling a size of an opening of the variable aperture to vary a size of a beam spot produced on a photosensitive medium. However, there is a problem in that a reduction in the quantity of incoming light, due to the use of such a variable aperture, leads to an undesirable variation of the quantity of light being exposed on the photosensitive medium.

Still another prior art apparatus as disclosed in Japanese Published Patent Application No. 61-33073 is directed to varying a diameter of a scanning beam spot by replacement of a plurality of beam diameter modification lenses positioned in an optical path. In this prior art apparatus, replacing such beam diameter modification lenses is a burdensome task, causing inconvenience for an operator who operates the apparatus.

Japanese Published Patent Application No. 56-71374 discloses an image recording method which is carried out with an image recording apparatus which is capable of generating several levels of optical density with pulse duration modulated signals obtained from electric input signals indicating a subject image including halftones, so that the information of the subject image containing multilevel gradation is reproduced. In this prior art recording apparatus, the beam diameter may be changed effectively only in a horizontal scanning direction. However, the drawback of this apparatus is that the beam diameter in a vertical scanning direction cannot be changed and so a multilevel gradation recording is not achieved in a manner adequate for commercial practice. The horizontal scanning direction described herein refers to a direction of scanning by a scanning mechanism from left to right or vice versa of a subject image as when reading a page of print, while the vertical scanning direction described herein refers to a direction of scanning due to a relative movement by a target surface from top to bottom or vice versa of a subject image with regard to an optical path along which a beam of light passes.

SUMMARY OF THE INVENTION

Accordingly, it is a general object of the present invention to provide a novel and useful optical scanning apparatus in which the above described problems are eliminated.

Another and more specific object of the present invention is to provide an optical scanning apparatus which can vary a diameter of a light beam without changing a drive current applied to a light source emitting the light beam. The above-mentioned object of the present invention is achieved by an optical scanning apparatus for scanning a beam from a light source over a target surface by a scanning mechanism to form an image on the target surface, the optical scanning apparatus including an electro-optic lens made from an electro-optic medium, the electro-optic lens being provided in an optical path between the light source and the scanning mechanism, the electro-optic lens having two opposing top and bottom surfaces, a plurality of electrodes being provided on the electro-optic lens for producing within the electro-optic lens an electric field that allows the beam emitted from the light source to be focused in a direction perpendicular to the direction of the optical path, and a voltage applying unit for applying a voltage to the electrodes, the voltage applying unit being connected to the electrodes so that an electric field is produced within the electro-optic lens when a voltage is applied to the electrodes. According to the present invention, it is possible for the incoming beam to pass through the electro-optic medium without changing the refractive index when no voltage is applied to the electrodes. And when a voltage is applied to the electrodes, it is possible to change the indices of refraction within the electro-optic medium due to an electro-optic effect, allowing the incoming beam to go out from the electro-optic medium with controlled levels of focusing. Therefore, according to the present invention, selecting appropriate levels of the voltage applied to the electrodes allows the diameter of the beam spots on the scanned surface to vary in a suitable manner without changing the drive current of a light source.

Still another object of the present invention is to provide an optical scanning apparatus which has a simplified structure, eliminating the need to provide a variable aperture or a plurality of replaceable beam-diameter modification lenses in the optical path. The above-mentioned object of the invention is achieved by an optical scanning apparatus for scanning a beam of light from a light source by a scanning mechanism over a target surface in a horizontal scanning direction, the target surface being moved in a vertical scanning direction in step with the horizontal scanning of the beam by the scanning mechanism to transmit an image to the target surface for reproducing the image on a recording paper, the optical scanning apparatus including an electro-optic lens made from an electro-optic medium, the electro-optic lens being provided in an optical path between the light source and the scanning mechanism, the electro-optic lens having two opposing top and bottom surfaces perpendicular to the vertical scanning direction and ingress and egress surfaces perpendicular to the direction of the optical path along which the beam passes, a set of first electrodes being provided on the electro-optic lens for producing an electric field that allows the beam to be focused in the vertical scanning direction, two sets of second electrodes being provided on the electro-optic lens for producing an electric field that allows the beam to be focused in the horizontal scanning direction, a voltage applying unit for applying a voltage having a pulse train with pulse levels in accordance with image signals to the first and second electrodes on the electro-optic lens, allowing an image to be transmitted to the target surface, and a bias voltage supplying unit for supplying a direct-current bias voltage to the first and second electrodes on the electro-optic lens. According to the present invention, it is possible to simplify the structure of the optical scanning apparatus without using a variable aperture and its control unit in the optical path or without using a plurality of replaceable beam diameter modification lenses. In addition, it is possible for the present invention to vary the diameter of a beam spot on the target surface at several levels by controlling the voltage applied to the electrodes, thereby allowing a multilevel gradation recording to be performed on a recording paper.

Other objects and further features of the present invention will be apparent from the following detailed description when read in conjunction with the accompanying drawings.

DESCRIPTION OF THE PREFERRED EMBODIMENTS

Referring first to FIGS. 1 through 6, a description will be given an optical scanning apparatus for scanning a beam of light from a light source in a systematic pattern over a scanned surface by a scanning mechanism, according to a first embodiment of the present invention.

Figure 1:
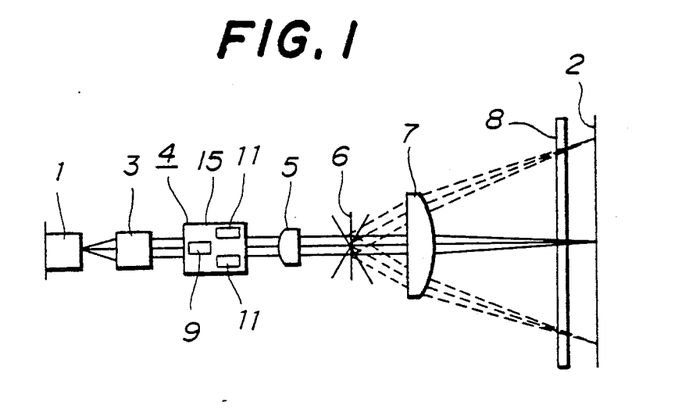
FIG.1 is a plan view of a first embodiment of an optical scanning apparatus according to the present invention.
Figure 2:
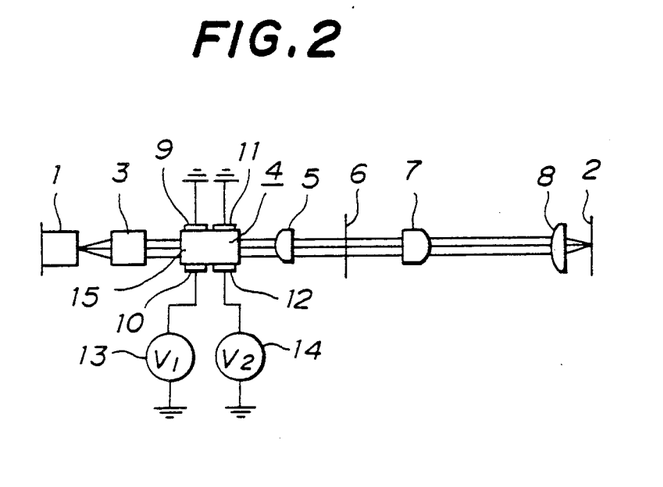
FIG. 2 is a side view of the first embodiment according to the present invention.

As shown in FIGS. 1 and 2, in an optical path between a laser diode 1 as a light source and a scanned surface 2, there are provided a collimator lens 3, an electro-optic micro-lens 4, a first cylindrical lens 5, a deflection reflecting plate 6, an f$\theta$ lens 7, and a second cylindrical lens 8. The deflection reflecting plate 6 acts as a scanning mechanism for scanning a focused beam of light from a light source over the scanned surface in the horizontal scanning direction. In the case of the optical scanning apparatus used in a laser printer, the scanned surface 2 is moved in the vertical scanning direction in step with the horizontal scanning of the beam by the scanning mechanism to transmit an image to a photosensitive medium surface for reproducing the image on a recording paper. The electro-optic micro-lens 4 is made from an electro-optic medium 15, and has a generally rectangular shape. A single set of first electrodes 9, 10 and two sets of second electrodes 11, 12 are provided on two opposing surfaces of the electro-optic medium 15, respectively. The electro-optic medium 15 employs, for example, a PLZT electro-optic crystal with a composition ratio of 9/65/35. However, the present invention is not limited to this particular composition ratio. An ingress surface and an egress surface of the PLZT electro-optic crystal are ground enough to provide an adequate electro-optic effect, and the electrodes 9 through 12 are provided on two opposing surfaces which are parallel to the horizontal scanning direction and perpendicular to the ingress and egress surfaces of the electro-optic micro-lens 4 through which the beam passes. The electrodes 9 through 12 are preferably formed into an evaporated Au film on the surface of the medium 15, but another conductive metal film may be selected as the electrode. In addition, it is possible to form the electrodes 9 through 12 by a screen printing technique with a paste or flux on such surfaces of the electro-optic medium 15. Further, the electrodes in this embodiment have a generally straight shape, but may be formed into a curved shape suitable for the desired result. With the electrodes 9 and 11 grounded, the electrodes 10 and 12 respectively are connected to voltage applying means 13 and 14 to apply a voltage in a direction perpendicular to the direction of an optical path along which the beam passes and parallel to the vertical scanning direction of the optical scanning apparatus.

A laser beam emitted from the laser diode 1 is collimated by the collimator lens 3, and passes through the electro-optic micro-lens 4 and through the first cylindrical lens 5. The laser beam is electrostatically deflected by the deflection reflecting plate 6 within a predetermined direction range and it passes through the fθ lens 7 and through the second cylindrical lens 8 and converges on a place on the scanned surface 2.

Figure 3:
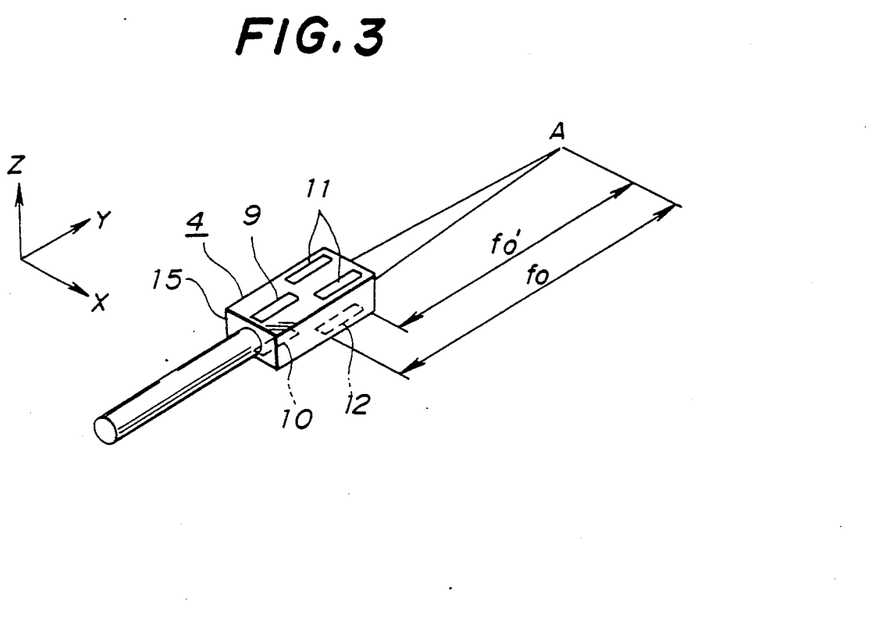
FIG. 3 is a perspective view of an electro-optic micro-lens of the first embodiment.
Figures 4A, 4B:
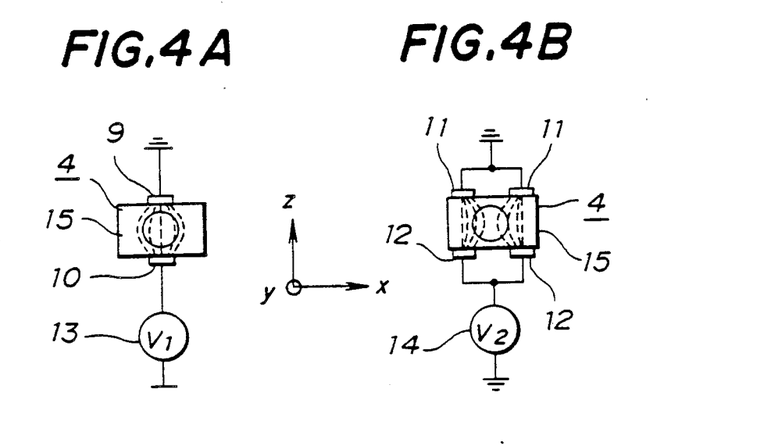
FIG. 4A and 4B are diagrams for explaining the electric field distribution within the electro-optic micro-lens of the first embodiment.

When no voltage is applied to the electrodes 10 and 12, the laser beam entering the electro-optic micro-lens 4 goes out from the exit surface of the electro-optic micro-lens 4 as a collimated beam with no deflection. When a voltage $V_1$ is applied to the electrode 10 by the voltage applying means 13 and a voltage $V_2$ is applied to the electrode 12 by the voltage applying means 14, an electric field is produced between the electrodes 9 and 10 in a direction perpendicular to the direction of the optical path of the passing beam and perpendicular to the horizontal scanning direction as shown in FIG.4A and an electric field is produced between the electrodes 11 and 12 as shown in FIG.4B. The electric field distribution is as shown in dotted lines in FIGS.4A and 4B, that is, the electric field is weak at a place far from the electrode and strong at a place near the electrode. As a result, the electro-optic effect of the electro-optic medium 15 (e.g. PLZT electro-optic crystal) leads to a refractive index distribution. In FIG.3, Z is the direction of an electric field, Y is the direction of an optical path of an incoming beam, and X is the direction of a horizontal scanning direction. A Z-direction component $n_z$ of the refractive index of the beam within the applied electric field is as follows:

$$n_z = n_o [1 - (\tfrac{1}{2}) n^2{}_o R_{33} E^2{}_z] \quad (1)$$

In this formula, $n_o$ is a refractive index of the electro-optic medium 15 (e.g. PLZT electro-optic crystal) when $E=0$, $R_{33}$ is a matrix component of the quadratic vertical electro-optic coefficient, and Ez is an electric field intensity. A change in refractive index due to the electric field Ez is as follows:

$$\Delta n_z = -(\tfrac{1}{2}) n^3{}_o R_{33} E^2{}_z \quad (2)$$

As indicated, the change in refractive index is proportional to the square of electric field intensity, the refractive index becomes smaller at places where the electric field intensity is greater, and a focusing takes place in the direction X as well as in the direction Z. Further, in this case, the greater the optical path length becomes, the sharper the focusing of the electro-optic micro-lens 4 is.

The collimated laser beam is linearly polarized in the direction Z. When the beam enters a region of the electro-optic micro-lens 4 between the electrodes 9 and 10, the beam is focused in the direction Z (vertical scanning direction) on a point A as shown in FIG.3, which leads to a focal length $f_o$ due to the voltage $V_1$ applied between the electrodes 9 and 10. When the beam enters a region of the electro-optic micro-lens 4 between the electrodes 11 and 12, the beam is focused in the direction X (horizontal scanning direction) on the point A of FIG.3, with a focal length $f_o'$ resulted from the voltage $V_2$ applied between the electrodes 11 and 12 of the electro-optic micro-lens 4.

Figure 5A:
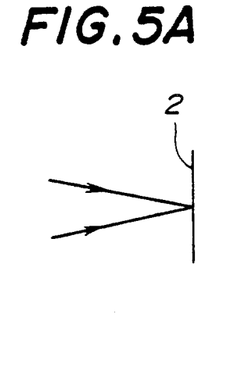
FIGS. 5A and 5B are diagrams for explaining the focusing of a laser beam on a scanned surface.
Figure 5B:
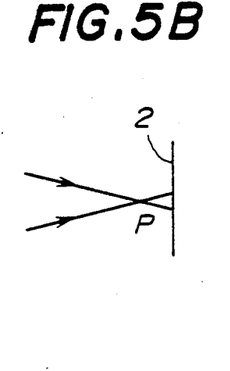
Figure 6A:
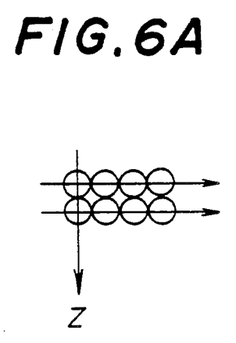
FIGS.6A and 6B are diagrams for explaining the change in beam diameter made by the optical scanning apparatus of the first embodiment.
Figure 6B:
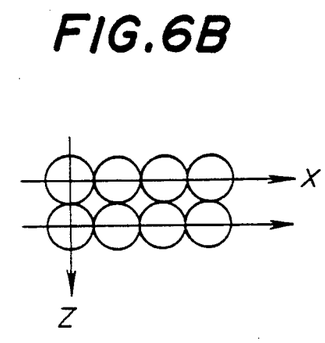

FIG.5A shows the focusing condition on the scanned surface 2 when no voltage is applied between the electrodes. FIG.5B shows the defocusing condition on the scanned surface 2 when the voltage is applied between the electrodes 9 and 10 and between the electrodes 11 and 12. The laser beam in this case is focused on a point P before reaching the scanned surface 2, is defocused from the point P, and is cast on the scanned surface 2 with a relatively large beam diameter. Therefore, the beam when no voltage is applied between the electrodes produces a small dot on the scanned surface 2 as shown in FIG.6A and the beam when the voltage is applied between the electrodes 9 and 10 and between the electrodes 11 and 12 produces a dot on the scanned surface 2 which is enlarged in the horizontal scanning direction X and in the vertical scanning direction Z, as shown in FIG.6B. In this embodiment, with the electrodes 9, 10 and the electrodes 11, 12 which are formed to have an appropriate length along the optical path, it is possible for the beam being refracted by the electrodes 9, 10 as well as by the electrodes 11, 12 to be focused on the same position in the horizontal and vertical scanning directions on the scanned surface 2 when the same voltage is applied.

As described above, it is possible to change the beam diameter in the horizontal scanning direction as well as in the vertical scanning direction by the focusing function of only the single electro-optic micro-lens 4 according to this embodiment. Thus, the structure of an optical scanning apparatus can be simplified, ensuring a reduction in reflection loss on end surfaces of the electro-optic micro-lens 4. The present invention therefore makes effective use of a beam of light emitted from a light source, and requires no additional adjustment of location of the electro-optic system arranged in the optical path because only the single electro-optic micro-lens 4 is used.

Figure 7:
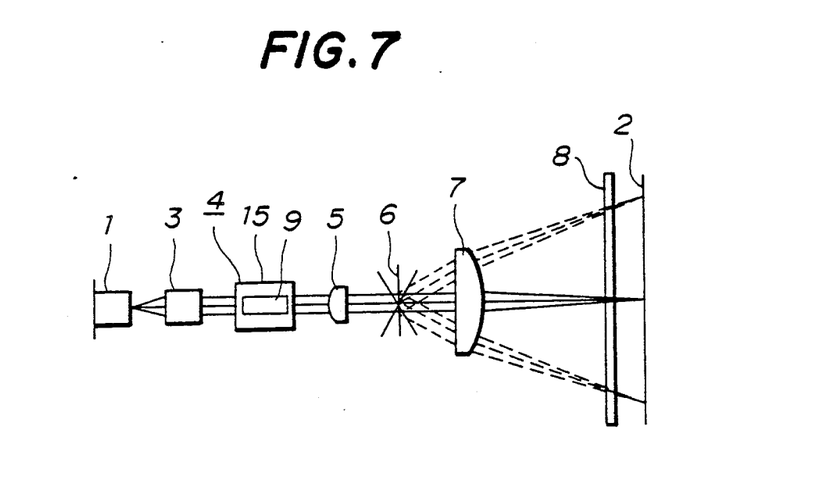
FIG.7 is a plan view of a second embodiment of the optical scanning apparatus according to the present invention.
Figure 8:
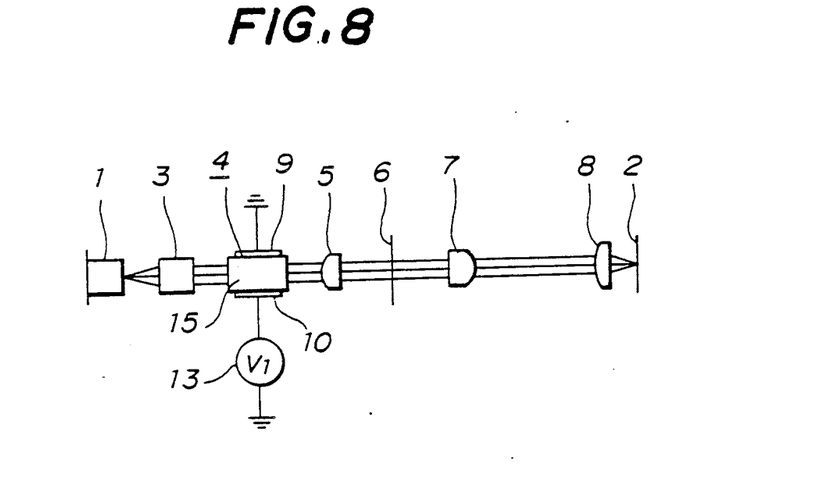
FIG.8 is a side view of the second embodiment according to the present invention.
Figure 9A:
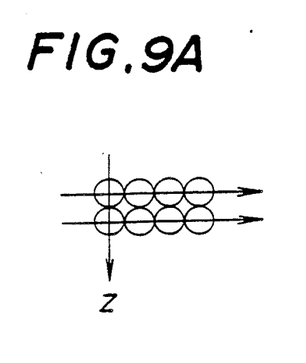
FIGS.9A and 9B are diagrams for explaining the change in beam diameter made by the second embodiment.
Figure 9B:
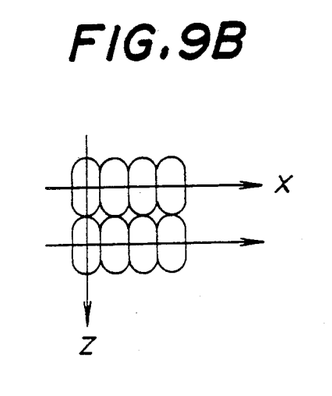

Next, a description will be given of a second embodiment of the optical scanning apparatus according to the present invention, by referring to FIGS.7 through 9. The same reference numbers as those in the above described first embodiment are used in these drawings to indicate the same components of the optical scanning apparatus according to the present invention, but similar descriptions of them are omitted to avoid repetition.

In this second embodiment, a single set of electrodes 9, 10 are provided on two opposing surfaces of the electro-optic medium 15. One electrode 9 is provided on the top surface of the electro-optic medium 15, and the other electrode 10 on the bottom surface thereof. The electrodes 9, 10 are aligned approximately along the line of the optical axis of the beam. The electrode 10 is connected to the voltage applying means 13, while the electrode 9 is grounded. With no voltage applied, the electro-optic micro-lens 4 shows no focusing, and beam spots being cast on the scanned surface 2 have a relatively small diameter in the vertical scanning direction Z as shown in FIG.9A. When a voltage $V_1$ is applied to the electrode 10, a beam entering a region of the resulting electric field within the electro-optic medium 15 is focused in the vertical scanning direction Z and the dot of an image produced on the scanned surface is, as shown in FIG.9B, enlarged in one direction, or it has a diameter enlarged in the vertical scanning direction Z when compared to a dot when no voltage is applied.

Figure 10:
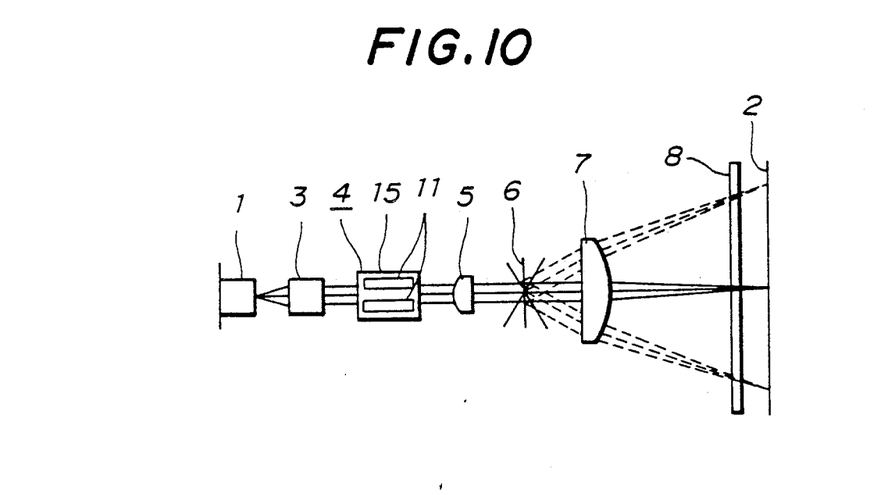
FIG.10 is a plan view of a third embodiment of the optical scanning apparatus according to the present invention.
Figure 11:
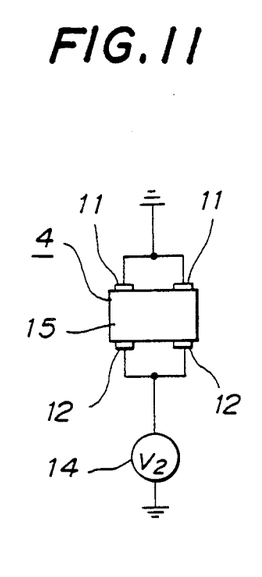
FIG.11 is a side view of the third embodiment according to the present invention.
Figure 12A:
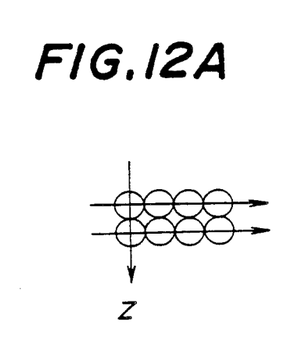
FIGS.12A and are diagrams for explaining the change in beam diameter made by the third embodiment.
Figure 12B:
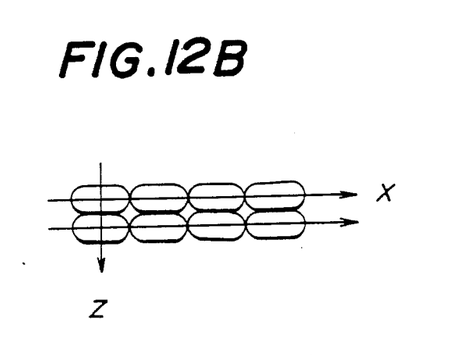
Figure 13:
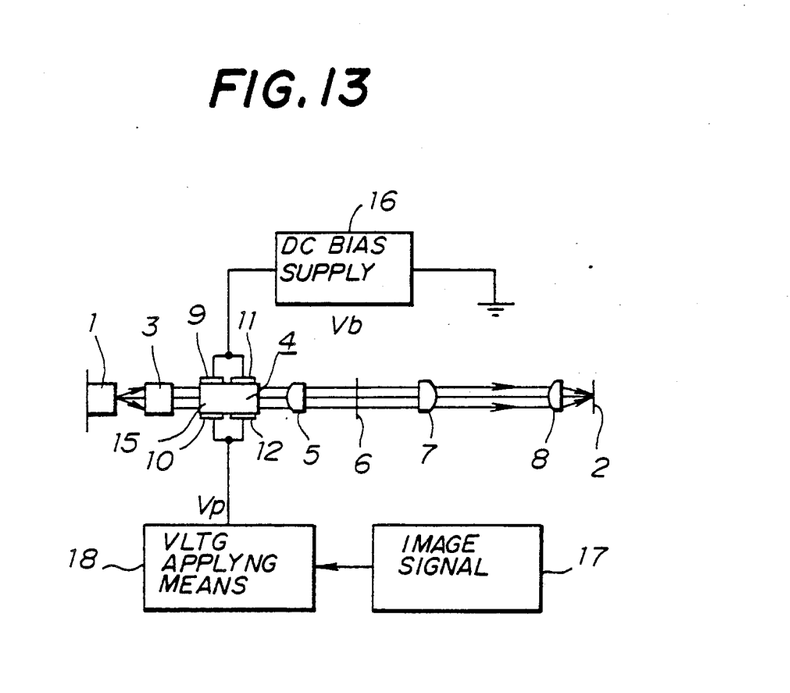
FIG.13 is a side view of a fourth embodiment of the optical scanning apparatus according to the present invention.
Figure 14:
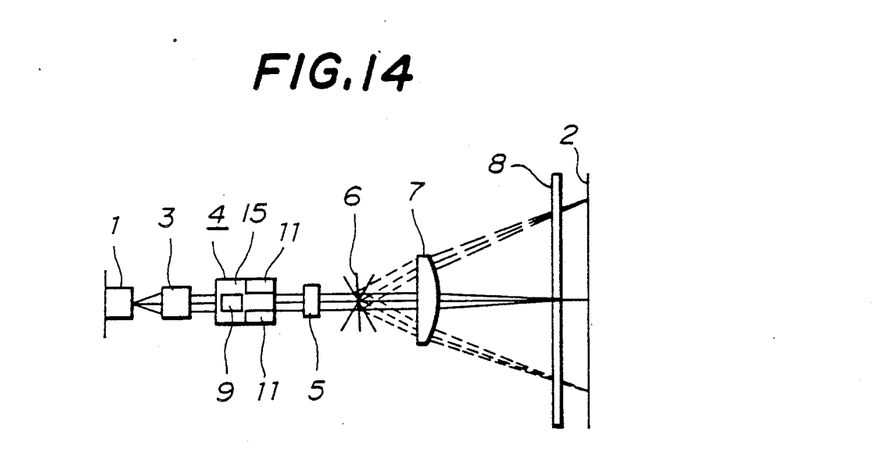
FIG.14 is a plan view of the fourth embodiment according to the present invention.

Next, a description will be given of a third embodiment of the optical scanning apparatus according to the present invention, by referring to FIGS.10 through 12. In this third embodiment, two sets of electrodes 11, 12 are arranged on two opposing top and bottom surfaces of the electro-optic medium 15. The electrodes 11 are provided on the top surface of the electro-optic medium 15 in two different rows aligned in the horizontal scanning direction so that the optical axis of the beam lies between the electrodes 11 when viewed from a direction perpendicular to the vertical scanning direction Z. The electrodes 12 are placed on the bottom surface of the electro-optic medium 15 in a manner similar to the electrodes 11 at locations which are opposed to the electrodes 11 on the top surface of the medium 15. The electrodes 12 are connected to the voltage applying means 14 while the electrodes 11 are grounded. With no voltage applied, the electro-optic micro-lens 4 exhibits no focusing, and beam spots on the scanned surface 2 have a relatively small diameter in the horizontal scanning direction X as shown in FIG.12A. When a voltage $V_2$ is applied to the electrodes 12, a beam entering a region of the resulting electric field within the electro-optic medium 15 is focused in the horizontal scanning direction X and the dot of an image on the scanned surface 2 is enlarged in one direction as shown in FIG.12B, or it has a diameter enlarged in the horizontal scanning direction X when compared to a dot when no voltage is applied.

Figure 15A:
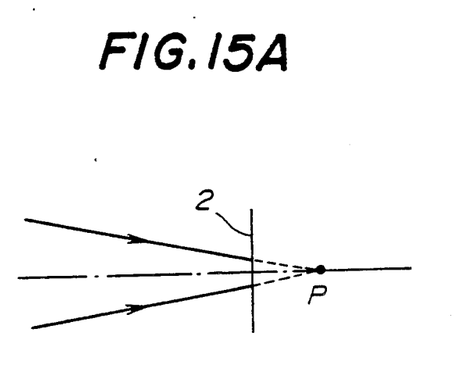
FIG. 15A and 15B are diagrams for explaining the focusing of a laser beam with respect to a scanned surface.
Figure 15B:
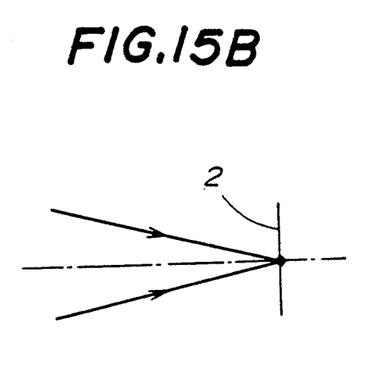

Next, a description will be given of a fourth embodiment of the optical scanning apparatus according to the present invention, by referring to FIGS.13 through 17. In this embodiment, the grounded-side electrodes 9, 11 are connected to a direct-current bias supply 16 while the opposite-side electrodes 10, 12 are connected to a voltage applying means 18 which generates a pulse train in accordance with image signals 17. As shown, a laser beam from the laser diode 1 is collimated by the collimator lens 3, and passes through the electro-optic micro-lens 4 and through the first cylindrical lens 5 which serves to focus the beam only in the vertical scanning direction. The laser beam is further deflected by the deflection reflecting plate 6 within a predetermined directional range, and passes through the fθ lens 7 and through second cylindrical lens 8 so that the beam converges on a place on the scanned surface 2. When only a bias voltage $V_b$ is applied by the direct-current bias supply 16 to the electrodes 9, 11, the beam is focused on a point on the scanned surface 2 with a small focal length, as shown in FIG.15B. Dots of the image produced on the scanned surface 2 in this case show a relatively small diameter. With a direct-current bias voltage $V_b$ applied to the electrodes 9, 11, negative level pulses (voltage $V_p$) generated in accordance with image signals are applied to the electrodes 10, 12 by the voltage applying means 18. The negative level pulses respectively have a minus level measured from a reference level determined by the direct-current bias voltage $V_b$. In this state, the beam is focused with a relatively great focal length, aiming at a point P behind the scanned surface 2. Dots of the image on the scanned surface 2 in this case therefore have a relatively large diameter, as shown in FIG.15A.

Figure 16:
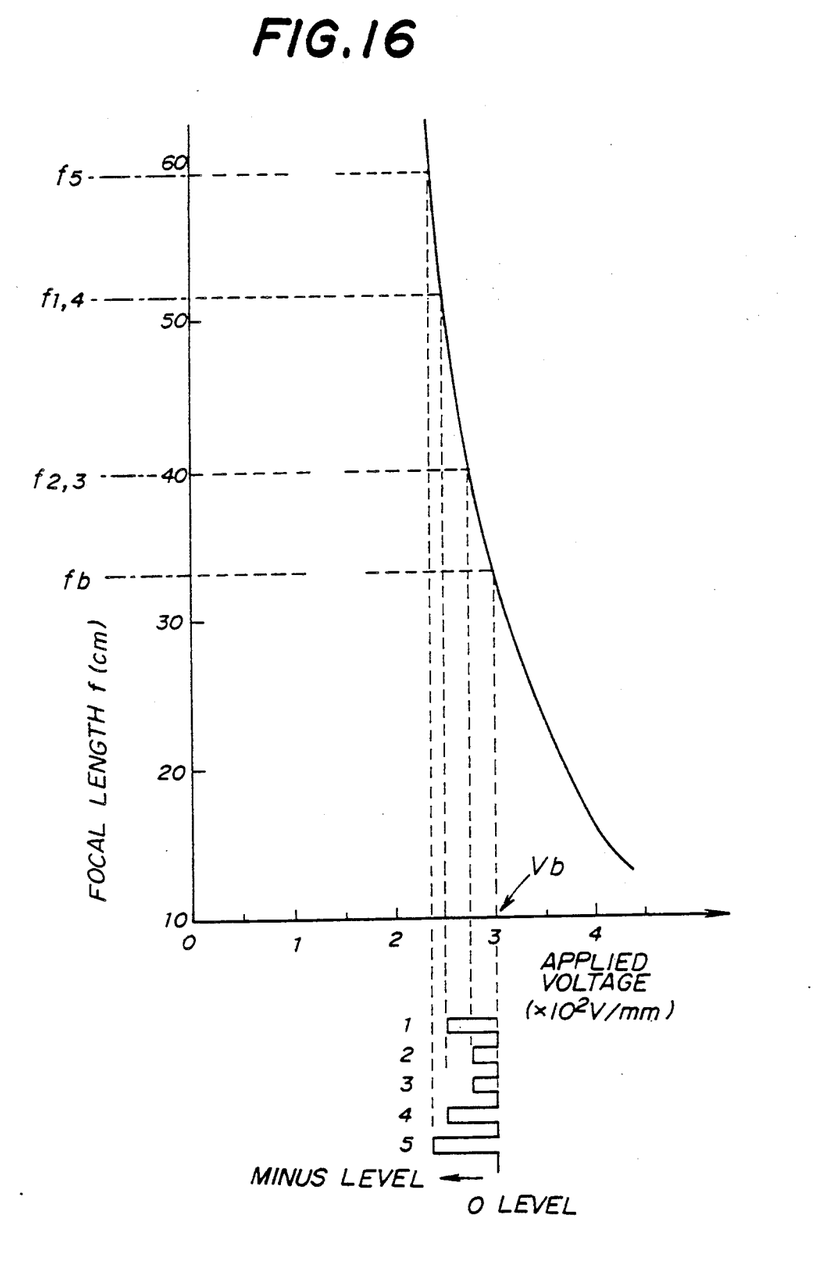
FIG. 16 is a chart showing the relationship between applied voltage and the focal length of an electro-optic micro-lens according to the fourth embodiment.
Figure 17:
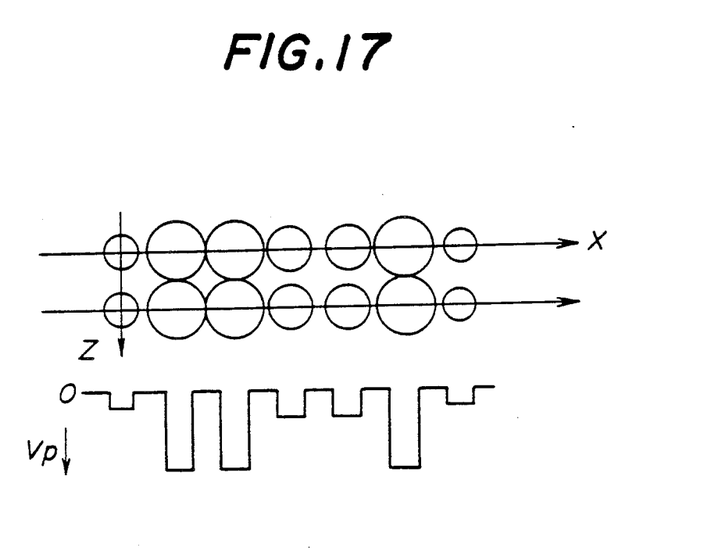
FIG.17 is a chart showing the relationship between a beam diameter and a pulse train from a voltage applying means according to the fourth embodiment.

FIG.16 is a chart showing the focal length versus applied voltage relationship of an electro-optic micro-lens 4 according to the fourth embodiment. In the chart shown, a focal length of the passing beam when the applied voltage is varied is plotted against the level of a voltage applied to the electro-optic micro-lens 4. When a bias voltage $V_b$ supplied from the direct-current bias supply 16 is 300 V/mm, the focal length $f_b$ at that voltage level is approximately 33 cm. In the condition where the direct-current bias voltage $V_b$ is applied, if a voltage $V_p$ supplied by the voltage applying means 18, on which the negative level pulses at levels 1 through 5 are superimposed in accordance with the image signals 17 are further applied to the electrodes 10, 12, the focal length f varies depending on the negative pulse level of the applied voltage. In this case, the level-1 through level-5 negative level pulses correspond, as in FIG.16, with the focal length values f1 through f5, respectively. FIG.17 is a diagram for explaining the relationship between the beam diameter and the pulse train sent from the voltage applying means 18. This indicates that changing the beam diameter at a number of levels in the horizontal and vertical scanning directions allows a multilevel gradation recording to be carried out.

Figure 18:
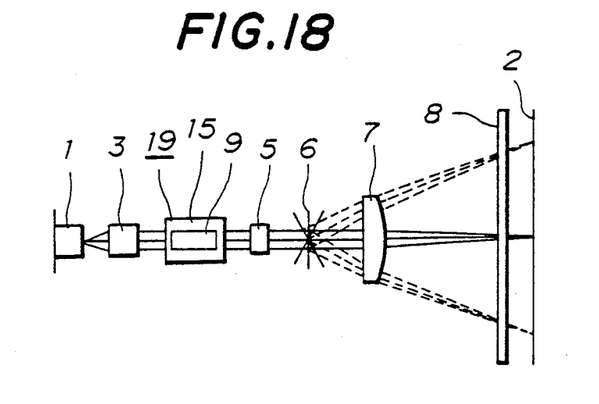
FIG. 18 is a plan view of a fifth embodiment of the optical scanning apparatus according to the present invention.
Figure 19:
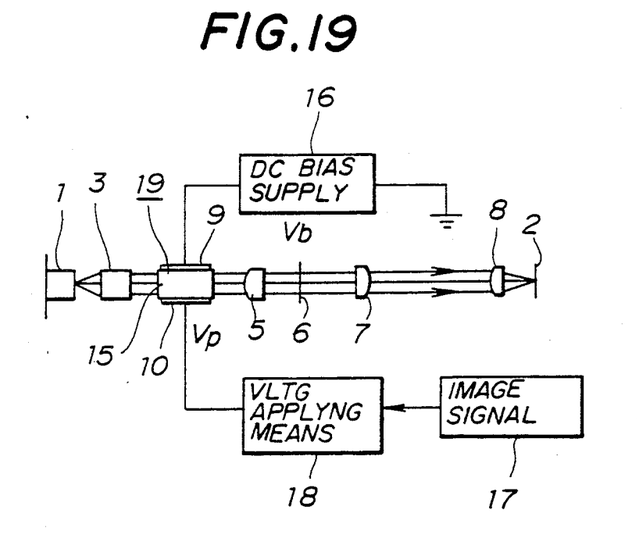
FIG. 19 is a side view of the fifth embodiment according to the present invention.
Figure 20:
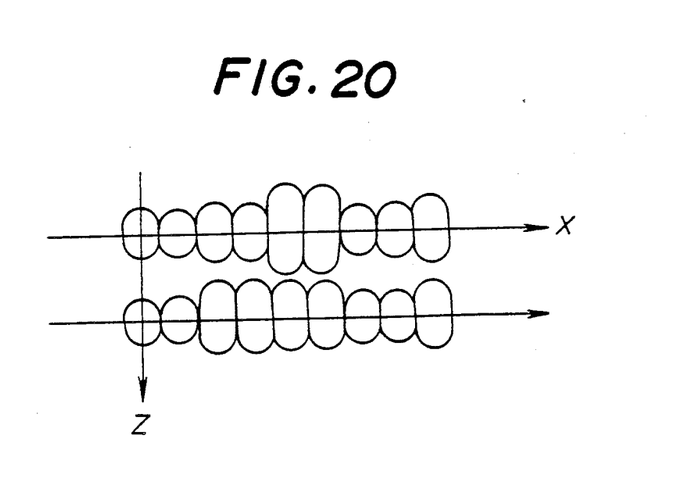
FIG.20 is a diagram for explaining the change in beam diameter made by the fifth embodiment.

Next, a description will be given of a fifth embodiment of the optical scanning apparatus according to the present invention, by referring to FIGS.18 through 20. In this embodiment, the optical scanning apparatus comprises an electro-optic micro-lens 19 provided with a single set of electrodes 9, 10 on two opposing surfaces of the electro-optic medium 15, a direct-current bias supply 16 being connected to the electrode 9, and a voltage applying means 18 being connected to the electrode 10. This optical scanning apparatus succeeds in varying the beam diameter in the vertical scanning direction by changing a voltage $V_b$ supplied from the direct-current bias supply 16 as well as a voltage $V_p$ supplied from the voltage applying means 18. FIG.20 is a diagram for explaining the relationship between the beam diameter and the pulse train sent from the voltage applying means 18. This indicates that changing the beam diameter at a number of levels in the vertical scanning direction allows a multilevel gradation recording to be carried out.

Figure 21:
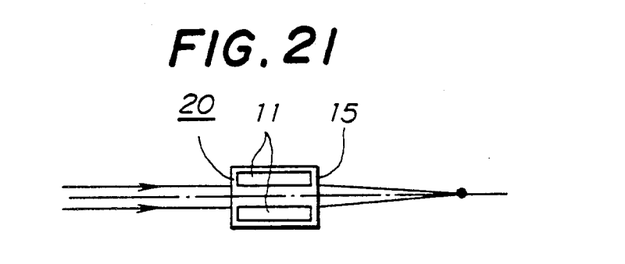
FIG. 21 is a plan view of a sixth embodiment of the optical scanning apparatus according to the present invention.
Figure 22:
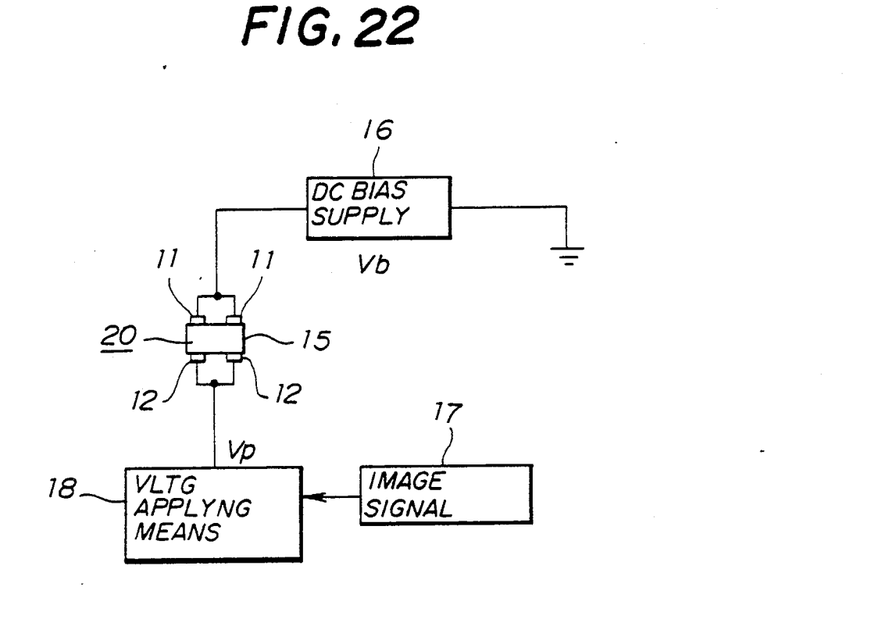
FIG. 22 is a side view of the sixth embodiment according to the present invention.
Figure 23:
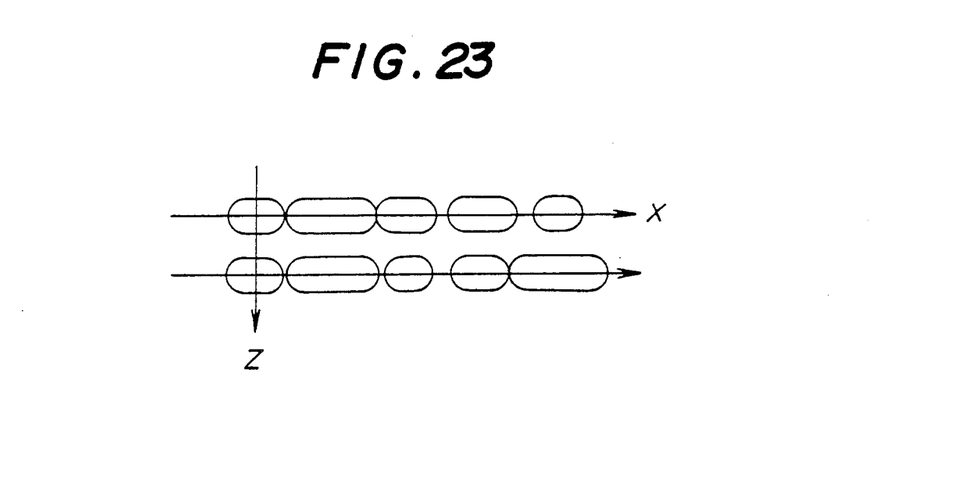
FIG. 23 is a diagram for explaining the change in beam diameter made by the sixth embodiment.

Next, a description will be given of a sixth embodiment of the optical scanning apparatus according to the present invention, by referring to FIGS.21 through 23. In this embodiment, the optical scanning apparatus comprises an electro-optic micro-lens 20 provided with two sets of electrodes 11, 12 on two opposing surfaces of the electro-optic medium 15, a direct-current bias supply 16 being connected to the electrodes 11, and a voltage applying means 18 being connected to the electrodes 12. This optical scanning apparatus succeeds in changing the beam diameter in the horizontal scanning direction by controlling a voltage $V_b$ supplied from the direct-current bias supply 16 as well as a voltage $V_p$ applied by the voltage applying means 18. FIG.23 is a schematic diagram for explaining the changing of the beam diameter in the horizontal scanning direction by the optical scanning apparatus.

Finally, a description will be given of a seventh embodiment of the optical scanning apparatus according to the present invention, by referring to FIGS.24A, 24B and 24C. The optical scanning apparatus in this embodiment comprises an electro-optic micro-lens 19 having the electrodes 9, 10 as shown in FIGS.18 and 19 and a modulation means of the drive pulse width for changing the beam diameter in the horizontal scanning direction through pulse-width modulation of the laser diode 1.

Figure 24A:
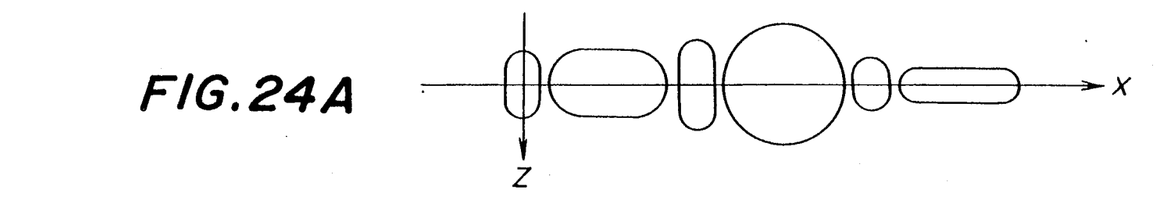
FIGS.24A, 24B and 24C are diagrams for explaining the relationship between a beam diameter, a laser diode drive pulse and an electro-optic micro-lens drive pulse.
Figure 24B:
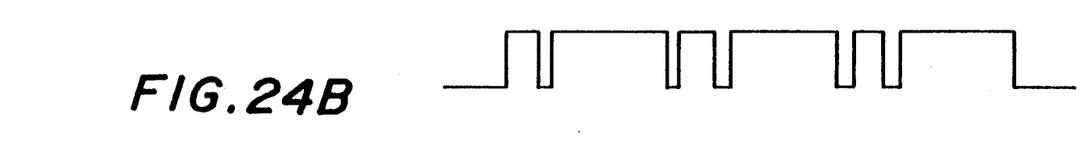
Figure 24C:
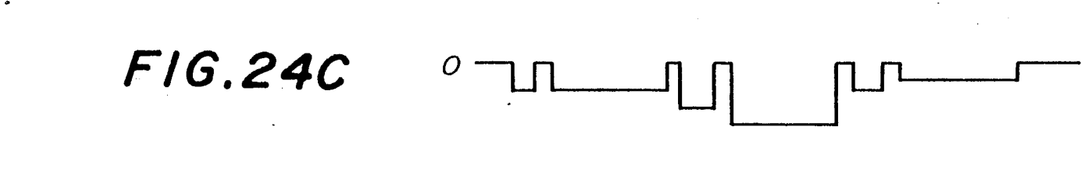

FIG.24A shows the changing of the beam diameter, FIG.24B shows the drive pulse train to the laser diode 1, and FIG.24C shows the drive pulse train applied by the voltage applying means 18 to the electro-optic micro-lens 19. Using an electro-optic micro-lens capable of changing the beam diameter in the horizontal scanning direction and in the vertical scanning direction, in addition to a pulse-width modulation means for changing the beam diameter both in the horizontal scanning direction and in the vertical scanning direction through modulation of the laser diode, allows a further improved multilevel gradation recording to be achieved.

Further, the present invention is not limited to these embodiments but various variations and modifications may be made without departing from the scope of the present invention.

What is claimed is:

1. An optical scanning apparatus for scanning a beam from a light source by a scanning mechanism over a target surface in a horizontal scanning direction, the target surface being moved in a vertical scanning direction in step with said horizontal scanning of the beam by the scanning mechanism to transmit an image to the target surface for reproducing the image on a recording paper, said optical scanning apparatus comprising:

electro-optical lens means made from an electro-optic medium, said electro-optic lens means being provided in an optical path between the light source and the scanning mechanism, the electro-optic lens means having two opposing top and bottom surfaces perpendicular to the vertical scanning direction and having ingress and egress surfaces perpendicular to the direction of the optical path along which the beam passes;

a set of first electrodes being provided on said electrooptic lens means for producing an electric field that allows the beam to be focused in the vertical scanning direction;

voltage applying means for applying a voltage to said first electrodes, said voltage applying applying means being connected to said first electrodes so that an electric field is produced within said electro-optic lens means when a voltage is applied to said first electrodes; and bias voltage supplying means for supplying a direct-current bias voltage to said first electrodes on said electro-optic lens means.

2. An apparatus as claimed in claim 1, wherein one of said first electrodes is provided on the top surface with said top-surface first electrode being connected to said bias voltage supplying means, the other of said first electrodes being provided on the bottom surface with said bottom-surface first electrode being connected to said voltage applying means, said first electrodes being opposed to each other across the electro-optic lens means.

3. An apparatus as claimed in claim 1, wherein said apparatus further comprises two sets of second electrodes being provided on said electro-optic lens means for producing an electric field that allows the beam to be focused in the horizontal scanning direction, one set of said second electrodes being provided in two rows on the top surface with said top-surface second electrodes being connected to said bias voltage supplying means, the other set of said second electrodes being provided in two rows on the bottom surface with said bottom-surface second electrodes being connected to said voltage applying means, said two sets of the second electrodes in two rows being opposed to each other across the electro-optic lens means so that the optical path is interposed between the two rows of the second electrodes when viewed from a direction perpendicular to the top surface of the electro-optic lens means.

4. An apparatus as claimed in claim 3, wherein said voltage being applied to said first and second electrodes contains negative level pulses with negative levels measured from a reference level of the direct-current bias voltage being supplied by the bias voltage supplying means, said negative levels being in accordance with the image signals so that the image is transmitted to the target surface with said beam aiming at a point behind the target surface, thereby allowing a dot with an enlarged diameter to be produced on the target surface.

5. An apparatus as claimed in claim 1, wherein the voltage applying means generates a pulse train in accordance with multilevel gradation image signals for applying the pulse train to said first electrodes on the electro-optic lens means so that multilevel gradation image signals indicative of a multilevel gradation image are transmitted to the target surface for reproducing the image on a recording paper.

6. An apparatus as claimed in claim 1, further comprising a pulse width modulation means for modulating a width of a drive pulse to drive the light source for emitting a light beam toward the target surface, a diameter of the light beam from the light source being varied through said pulse width modulation at a number of levels in the horizontal scanning direction.

7. An optical scanning apparatus for scanning a beam from a light source over a target surface by a scanning mechanism to form an image on the target surface, the optical scanning apparatus comprising:

electro-optic lens means made from an electro-optic medium, said electro-optic lens means being provided in an optical path between the light source and the scanning mechanism, said electro-optic lens means having two opposing top and bottom surfaces;

a plurality of electrodes provided on said electro-optic lens means for producing within said electro-optic lens means an electric field that allows said beam from said light source to be focused in a direction perpendicular to the direction of the optical path, wherein said plurality of electrodes comprises two sets of electrodes for producing an electric field that allows said beam to be focused in a horizontal scanning direction, one set of said electrodes provided in two rows on said top surface of the electro-optic lens means with said top-surface electrodes being grounded, and the other set of said electrodes provided in two rows on said bottom surface thereof said bottom-surface electrodes being connected to said voltage applying means, so that said beam is focused in the horizontal scanning direction to produce a dot with an enlarged diameter on the target surface; and a voltage applying means for applying a voltage to said electrodes, said voltage applying means being connected to said electrodes so that an electric field is produced within said electro-optic lens means when a voltage is applied to said electrodes.

8. An optical scanning apparatus for scanning a beam from a light source over a target surface by a scanning mechanism to form an image on the target surface, the optical scanning apparatus comprising:

electro-optic lens means made from an electro-optic medium, said electro-optic lens means being provided in an optical path between the light source and the scanning mechanism, said electro-optic lens means having two opposing top and bottom surfaces;

a plurality of electrodes provided on said electro-optic lens means for producing within said electro-optic lens means an electric field that allows said beam from said light source to be focused in a direction perpendicular to the direction of the optical path, wherein said plurality of electrodes comprises a set of first electrodes and two sets of second electrodes, said first electrodes serving to produce an electric field that allows said beam to be focused in a vertical scanning direction, one of said first electrodes provided on said top surface with said top-surface first electrode being grounded, the other of said first electrodes provided on said bottom surface with said bottom-surface first electrode being connected to said voltage applying means, said two sets of the second electrodes serving to produce an electric field that allows said beam to be focused in a horizontal scanning direction, one set of said second electrodes provided on said top surface with said top-surface second electrode being grounded, and the other set of said second electrodes provided on said bottom surface with said bottom-surface second electrodes being connected to said voltage applying means, so that said beam is focused not only in the horizontal scanning direction b ut also in the vertical scanning direction to produce a dot with an enlarged diameter on the target surface; and a voltage applying means for applying a voltage to said electrodes, s aid voltage applying means being connected to said electrodes so that an electric field is produced within said electro-optic lens means when a voltage is applied to said electrodes.

9. An optical scanning apparatus for scanning a beam from a light source over a target surface by a scanning mechanism to form an image on the target surface, the optical scanning apparatus comprising:

electro-optic lens means made from an electro-optic medium, said electro-optic lens means being provided in an optical path between the light source and the scanning mechanism, said electro-optic lens means having two opposing top and bottom surfaces;

a plurality of electrodes provided on said electro-optic lens means for producing within said electro-optic lens means an electric field that allows said beam from said light source to be focused in a direction perpendicular to the direction of the optical path;

a voltage applying means for applying a voltage to said electrodes, said voltage applying means being connected to said electrodes so that an electric field is produced within said electro-optic lens means when a voltage is applied to said electrodes; and a pulse width modulation means for modulating a drive pulse width for driving the light source, allowing the diameter of the beam from the light source to change at a number of levels in a horizontal scanning direction, and said plurality of electrodes being provided on said electro-optic lens means and producing an electric field that allows the beam to be focused in a vertical scanning direction so that the diameter of said beam is varied further in the vertical scanning direction.

* * * * *